United States Patent
Suzuyama et al.

(10) Patent No.: US 10,058,967 B2
(45) Date of Patent: Aug. 28, 2018

(54) MANUFACTURING SYSTEM

(71) Applicant: FUJI MACHINE MFG. CO., LTD., Chiryu-shi (JP)

(72) Inventors: Shigefumi Suzuyama, Toyota (JP); Shuichi Hirata, Toyota (JP); Kenji Mizuta, Kasugai (JP)

(73) Assignee: FUJI MACHINE MFG. CO., LTD., Chiryu-shi (JP)

(*) Notice: Subject to any disclaimer, the term of this patent is extended or adjusted under 35 U.S.C. 154(b) by 0 days.

(21) Appl. No.: 15/518,673

(22) PCT Filed: Oct. 24, 2014

(86) PCT No.: PCT/JP2014/078326
§ 371 (c)(1),
(2) Date: Apr. 12, 2017

(87) PCT Pub. No.: WO2016/063410
PCT Pub. Date: Apr. 28, 2016

(65) Prior Publication Data
US 2017/0232567 A1    Aug. 17, 2017

(51) Int. Cl.
*B23Q 37/00* (2006.01)
*B23Q 39/04* (2006.01)
(Continued)

(52) U.S. Cl.
CPC .......... *B23Q 39/04* (2013.01); *B23P 23/02* (2013.01); *B23Q 1/0054* (2013.01);
(Continued)

(58) Field of Classification Search
CPC .. B23Q 37/002; B23Q 37/005; B23Q 37/007; B23Q 39/04; B23Q 37/00;
(Continued)

(56) References Cited

U.S. PATENT DOCUMENTS 1,617,606 A * 2/1927 Pierle ............... B23Q 37/00
29/33 P
5,657,529 A * 8/1997 Bohn ................ B41F 17/02
29/563
(Continued)

FOREIGN PATENT DOCUMENTS

DE            9208584 U1 *  9/1992
DE   102007008219 A1 *  8/2008
(Continued)

OTHER PUBLICATIONS

International Search Report dated Jan. 20, 2015 in PCT/JP14/78326 filed Oct. 24, 2014.

*Primary Examiner* — Erica E Cadugan
(74) *Attorney, Agent, or Firm* — Oblon, McClelland, Maier & Neustadt, L.L.P.

(57) ABSTRACT

A manufacturing system including a base and multiple work machine modules that are arranged in an arrangement direction on base to be attachable to and detachable from base, in which one wheel of a pair provided on work machine module is engaged with one rail of a pair provided on base in a state in which positional deviation in the arrangement direction is prohibited, and the other wheel of the pair is engaged with the other rail of the pair in a state in which positional deviation is permitted in the arrangement direction, thereby the position of work machine modules on the base in the arrangement direction is specified, and work machine modules are fixed at a setting position on the base to be restricted so as to be drawn toward the base by a module fixing mechanism that is provided on the base.

11 Claims, 18 Drawing Sheets

(51) Int. Cl.
  *B23Q 7/14* (2006.01)
  *B23Q 1/28* (2006.01)
  *B23P 23/02* (2006.01)
  *B23Q 1/00* (2006.01)
  *B23Q 1/26* (2006.01)
  *B23Q 7/04* (2006.01)
  *B23Q 7/05* (2006.01)
  *B23Q 7/10* (2006.01)
  *B23Q 17/20* (2006.01)
  *B23C 1/06* (2006.01)
  *B23B 3/00* (2006.01)
  *B23B 39/00* (2006.01)
  *B23F 5/22* (2006.01)
  *B23Q 41/02* (2006.01)
  *B23Q 39/00* (2006.01)

(52) U.S. Cl.
  CPC ............ *B23Q 1/0072* (2013.01); *B23Q 1/26* (2013.01); *B23Q 7/1405* (2013.01); *B23Q 37/005* (2013.01); *B23Q 37/007* (2013.01); *B23B 3/00* (2013.01); *B23B 39/00* (2013.01); *B23C 1/06* (2013.01); *B23F 5/22* (2013.01); *B23Q 7/04* (2013.01); *B23Q 7/05* (2013.01); *B23Q 7/10* (2013.01); *B23Q 17/20* (2013.01); *B23Q 41/02* (2013.01); *B23Q 2039/008* (2013.01); *Y10T 29/50* (2015.01); *Y10T 29/5124* (2015.01)

(58) Field of Classification Search
  CPC ....... B23Q 7/14–7/1494; B23Q 39/048; Y10T 29/5124; Y10T 29/5196; Y10T 29/50
  USPC .......................................... 29/560, 563, 33 P
  See application file for complete search history.

(56) References Cited

U.S. PATENT DOCUMENTS

| | | | |
|---|---|---|---|
| 6,478,722 B1* | 11/2002 | Graham | B23Q 37/00 29/243.53 |
| 2006/0104751 A1 | 5/2006 | Arai | |
| 2009/0010739 A1* | 1/2009 | Hinderer | B23P 21/00 414/222.07 |
| 2016/0214225 A1* | 7/2016 | Mizuta | B23Q 39/04 |
| 2016/0214226 A1* | 7/2016 | Nagato | B23Q 39/04 |
| 2016/0214227 A1* | 7/2016 | Nagato | B23Q 39/04 |
| 2017/0225285 A1* | 8/2017 | Asakawa | B23Q 41/04 |
| 2017/0274486 A1* | 9/2017 | Suzuyama | B23Q 3/1552 |

FOREIGN PATENT DOCUMENTS

| | | |
|---|---|---|
| DE | 102012107627 A1 * | 2/2014 |
| JP | 2006-68894 A | 3/2006 |
| WO | WO-2015/037148 A1 * | 3/2015 |

\* cited by examiner (a)

(b)

(a)

(b)

MANUFACTURING SYSTEM

TECHNICAL FIELD

The present disclosure relates to a manufacturing system in which multiple work machines are disposed.

BACKGROUND ART

A system such as described in the patent literature below is considered as a manufacturing system which is constituted such that work machines including a machine tool are disposed in one line and multiple work machines sequentially perform work on one workpiece. In the system, multiple machine tools in which one machine main body section is mounted on one base are lined up, and each machine main body section is attachable to and detachable from each base. Therefore, the system is highly convenient for maintenance, replacement, and the like of the machine main body section.

CITATION LIST

Patent Literature

PTL 1: JP-A-2006-68894

SUMMARY

In a manufacturing system in which there are many machine tools that perform relatively precise work and the multiple work machines described above are replaceable, it is necessary to accurately mount a machine main body section at a designated position on a base. The present disclosure is carried out from the above viewpoint, and has an object of providing a manufacturing system that is provided with a base, and multiple work machine modules that are mounted on the base to be attachable and detachable, in which it is possible to mount the multiple work machine modules at the designated position on the base.

In order to solve the problem, the manufacturing system of the present disclosure includes a base which has multiple rail pairs that are provided to correspond to multiple work machine modules, and are respectively configured by one pair of rails that are laid so as to extend in an intersecting direction that is a direction that intersects with an arrangement direction, each of the multiple work machine modules has one pair of wheels, and the base is configured such that the position in the arrangement direction on the base of each of the multiple work machine modules is specified by one wheel of the one pair engaging with one rail of the one pair constituting the rail pair that corresponds thereto in a state in which positional deviation in the arrangement direction is prohibited and the other wheel of the one pair engaging with the other rail of the one pair constituting the rail pair that corresponds thereto in a state in which positional deviation is permitted in the arrangement direction, and the base is further configured to have multiple module fixing mechanisms, each of which restricts any one of the multiple work machine modules such that the work machine module is drawn toward the base, and fixes the work machine module at a setting position that is a designated position on the base.

Advantageous Effects

With the manufacturing system of the present disclosure, with one of the wheels of one pair and one rail of one pair that are engaged in a state in which positional deviation in the arrangement direction is prohibited as a reference, the position of each work module is determined in the arrangement direction on the base and each work module fixed at the position using a module fixing mechanism. Therefore, according to the manufacturing system of the present disclosure, it is possible to accurately mount each of the multiple work machine modules that are attachable and detachable at a designated position on the base.

DESCRIPTION OF EMBODIMENTS

An example of a manufacturing system that is an embodiment of the present disclosure will be described below with reference to the drawings. Note that, in addition to the embodiments below, the present disclosure is able to be implemented in a state in which various modifications are carried out based on knowledge of a person skilled in the art.

Overall Configuration of Manufacturing System

Figure 1:
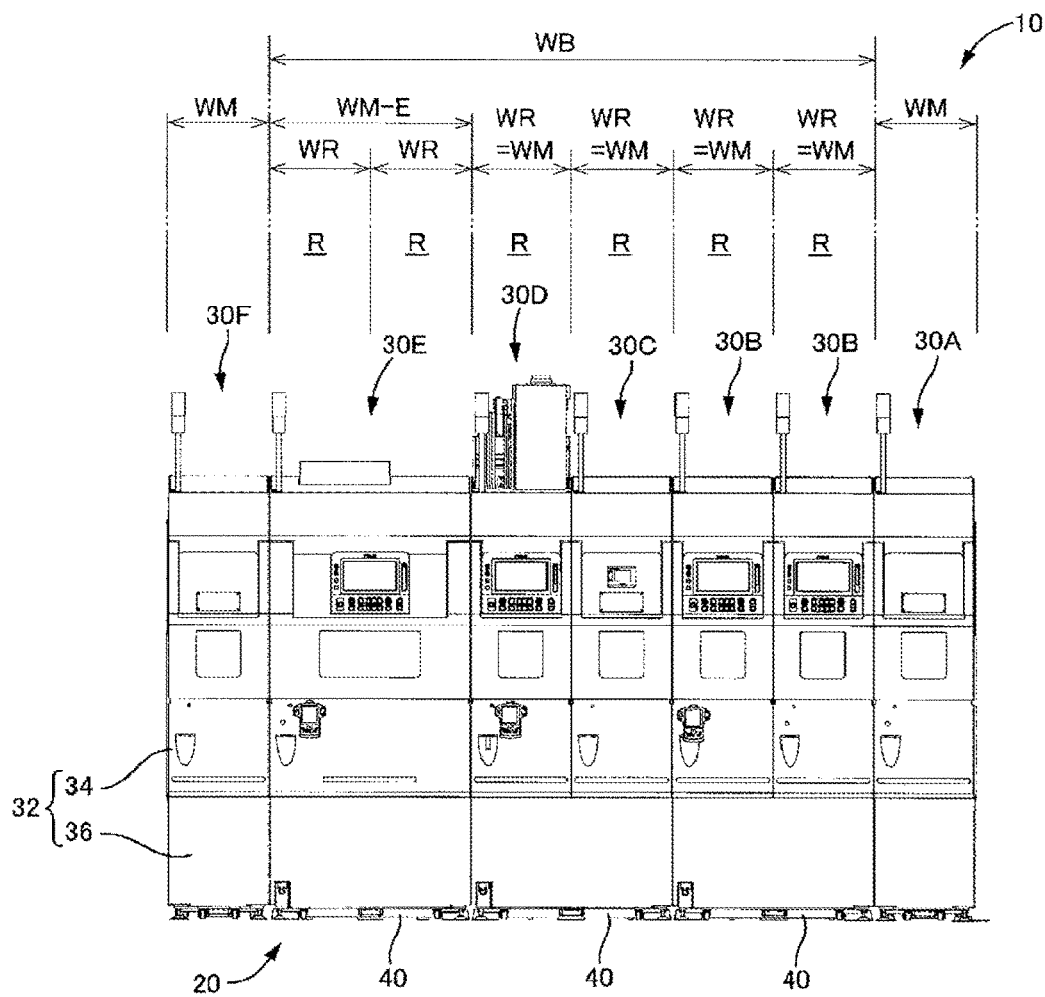
FIG. 1 is a front view of a manufacturing system that is an embodiment of the present disclosure.
Figure 2:
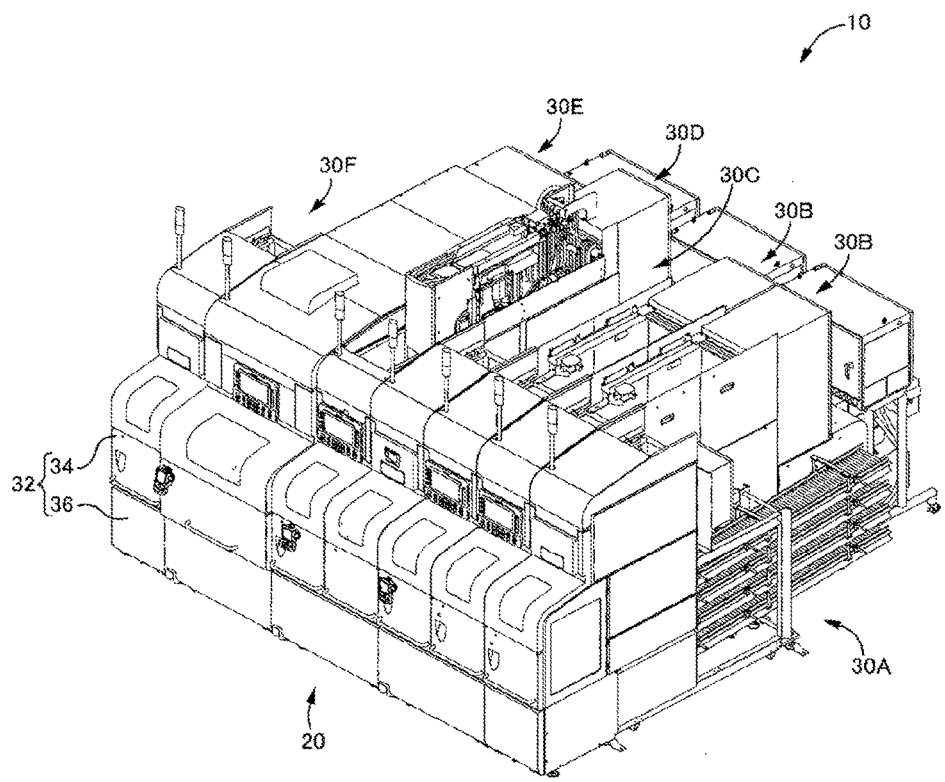
FIG. 2 is a perspective view illustrating the manufacturing system indicated in FIG. 1 in a viewpoint from the right front.

As shown in FIGS. 1 and 2, manufacturing system 10 that is an embodiment of the present disclosure is provided with base 20 and seven work machine modules 30 arranged on base 20. One side of manufacturing system 10 of the present embodiment indicated in FIG. 1 is covered by exterior panel 32. Note that, exterior panel 32 is configured to include upper panel 34 and lower panel 36, upper panel 34 being provided corresponding to each of the seven work machine modules 30, and each work machine module 30 is modularized to include upper panel 34. In the description below, the side that is covered by exterior panel 32 is referred to as the front side, and the "front-back", "left-right", and "up-down" in relation to system 10 are the front-back, left-right, and up-down viewed from the front side of system 10. That is, the left-right direction in which the seven work machine modules 30 are arranged is an arrangement direction, and the front-back direction is an intersecting direction that is a direction that intersects with (is orthogonal to) the arrangement direction.

The five of the seven work machine modules 30 except for those at both ends are mounted on base 20, the work machine modules of both ends are disposed next to base 20, and the seven work machine modules 30 are arranged close to each other in one line. Note that, the seven work machine modules 30 include six types of work machine modules 30A, 30B, 30C, 30D, 30E, and 30F described in detail later. Upper panels 34 corresponding to work machine modules except for 30E out of the six types of work machine modules 30 have approximately equal form, dimensions, and structure as each other. In addition, the dimension in the arrangement direction of upper panel 34 that corresponds to work machine module 30E is two times the dimension of upper panel 34 of the other work machine modules 30A, 30B, 30C, 30D, and 30F, but the form and structure are the same. Accordingly, manufacturing system 10 has unified in appearance.

In the manufacturing system of the present embodiment, a concept is adopted of a "disposition region" that relates to a disposition of module 30 on base 20. As shown in FIG. 1, disposition regions R are virtual spaces that are set to partition on base 20, and it is possible to consider region R as a unit of space that defines a space in which each module 30 is disposed. As understood from FIG. 1, the disposition regions R are arranged in the arrangement direction to contact each other without an interval, and region widths WR that are widths of each disposition region R are equal to each other.

Meanwhile, module widths WM of three types of work machine modules 30B, 30C, and 30D out of the work machine modules 30 that are mounted on base 40 are substantially equal to the region widths WR of the disposition region R (strictly, the module widths WM are slightly smaller than the region widths WR), and the work machine modules 30B, 30C, and 30D occupy only one disposition region R. That is, it is possible to consider that the three types of work machine modules 30B, 30C, and 30D are single region modules. In addition, a module width WM-E of the remaining one type of work machine module 30E out of the work machine modules 30 that are mounted on base 40 is substantially equal to two times the region widths WR of the disposition region R, and occupies two disposition regions R. That is, it is possible to consider that the work machine module 30E is a multi-region module that occupies two or more disposition regions.

In addition, with disposition region R, region width R is small relative to the dimension in the front-back direction. Also, the dimension WB of base 20 in the left-right direction is approximately equal to the dimensions of the six work machine modules 30 in the left-right direction in a state in which the six work machine modules 30 are mounted. That is, base 20 has a size in the left-right direction such that the six work machine modules 30 are precisely placed. From such a configuration above, the overall length of manufacturing system 10 in the arrangement direction that is comparatively short even though seven work machine modules 30 are arranged.

Figure 3:
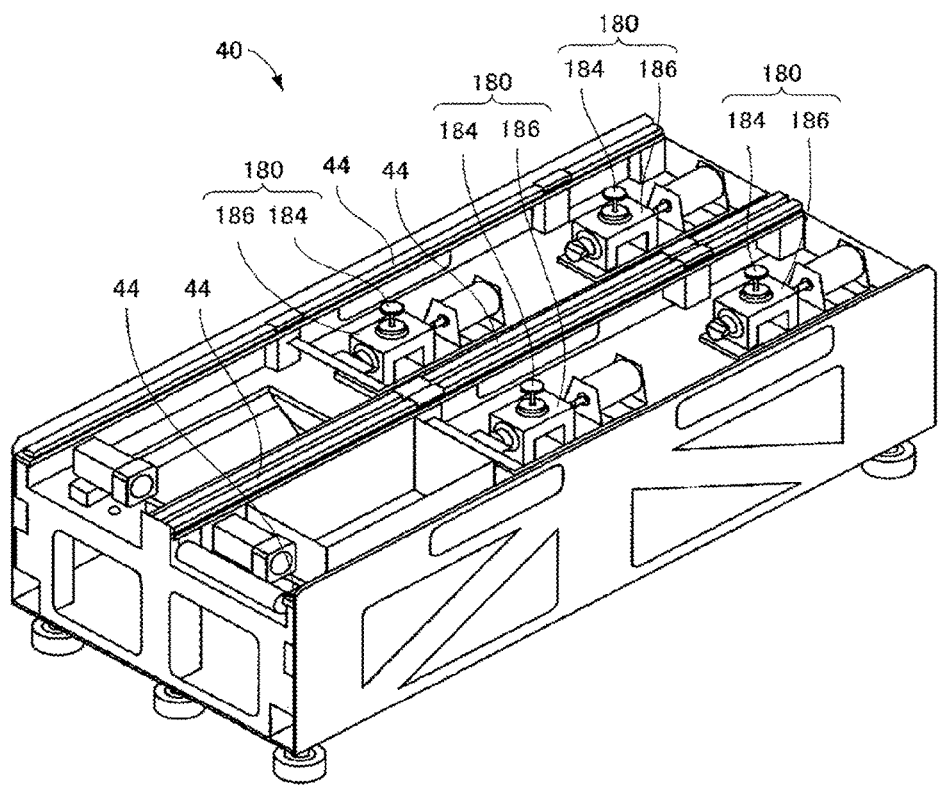
FIG. 3 is a perspective view illustrating one base unit that constitutes a base.

Base 20 is three base units 40 indicated in FIG. 3 that are lined up and fixed to each other. Two disposition regions R are set in each of base units 40, and two single region modules are able to be mounted on each of the base units 40. The three base units 40 are each standardized, and have the same form, dimensions, and structure as each other. Also, as shown in FIG. 3, on each base unit 40, two sets of two rails 44 separated by a gap corresponding to each of the two disposition regions R are laid so as to extend in the intersecting direction (front-back direction). Note that, in manufacturing system 10, base 20 is constituted by multiple base units, but there may be a system in which multiple work machine modules 30 are arranged to be mounted on one base as a single object.

Meanwhile, the single region modules 30B, 30C, and 30D out of the work machine modules 30 that are mounted on base 20 are configured to include a work machine main body section which will be described in detail later, one pair of wheels 46 provided at each of the front and the back, that is, two pairs of wheels 46, and bed 48 that holds the two pairs of wheels 46 while fixing the work machine main body section. As shown in FIG. 4(a), the two pairs of wheels 46 and bed 48 are standardized, and have the same form, dimensions, and structure as each other. Also, the single region modules 30B, 30C, and 30D are able to be easily pulled out from base unit 40 at both sides in the intersecting direction, in detail, the front side and the back side, by the two pairs of wheels 46 rolling on two rails 44 that are laid in a single disposition region R.

In addition, as shown in FIG. 4(b), the multi-region module 30E that occupies two disposition regions R has bed 50 configured as if two beds 48 of the single region module were connected, and holds a component that is the same as the two pairs of wheels 46 of the single region modules 30B, 30C, and 30D on the bed 50. Also, the multi-region module 30E is configured such that the two pairs of wheels 46 on the outside out of four rails 44 that are laid in two disposition regions R in the arrangement direction respectively roll. That is, the multi-region module 30E is able to be easily pulled out from the base unit 40 at both sides in the intersecting direction, in the same manner as the single region modules 30B, 30C, and 30D.

Figure 5:
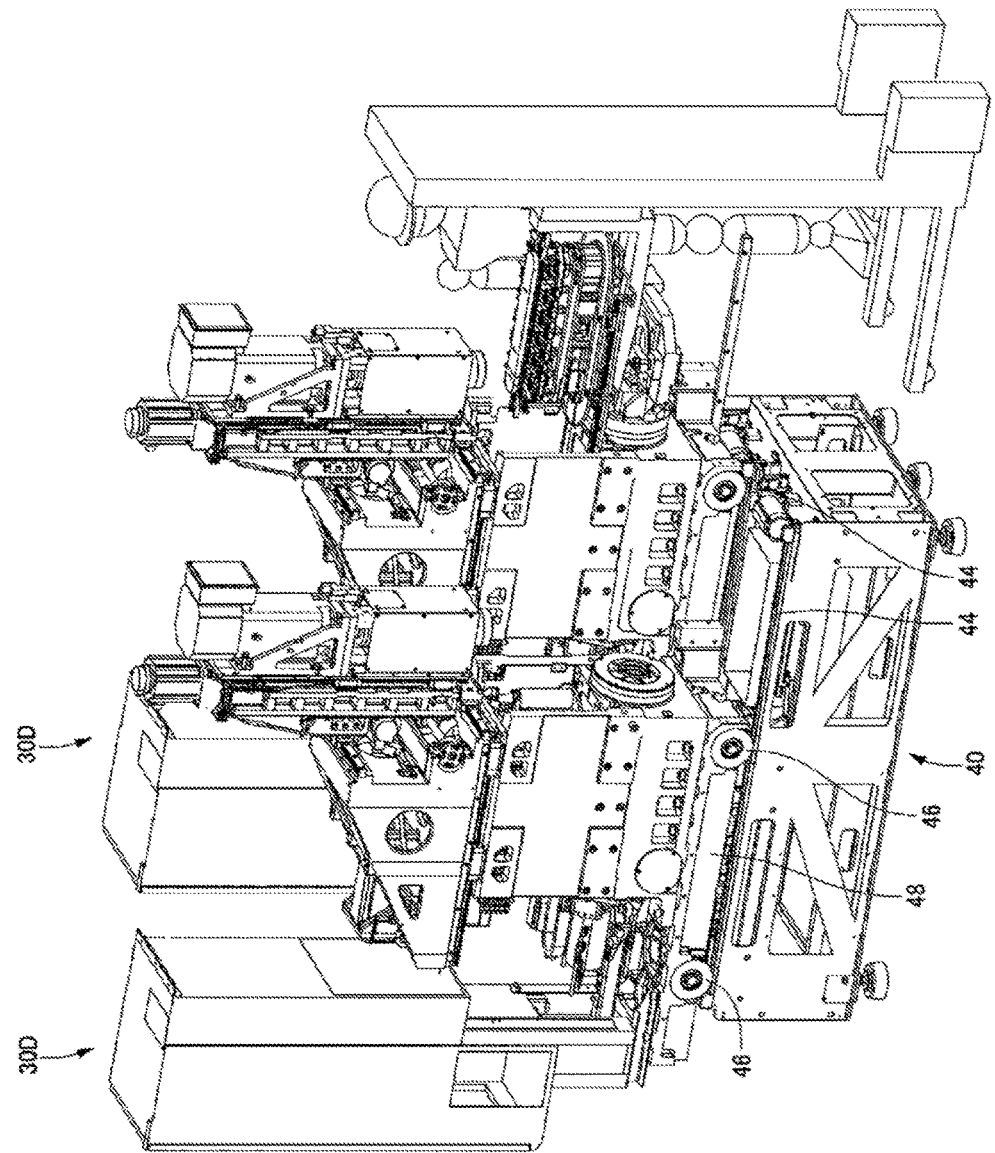
FIG. 5 is a perspective view illustrating a state in which a work machine module indicated in FIG. 1 is pulled out from the front on a base.
Figure 6:
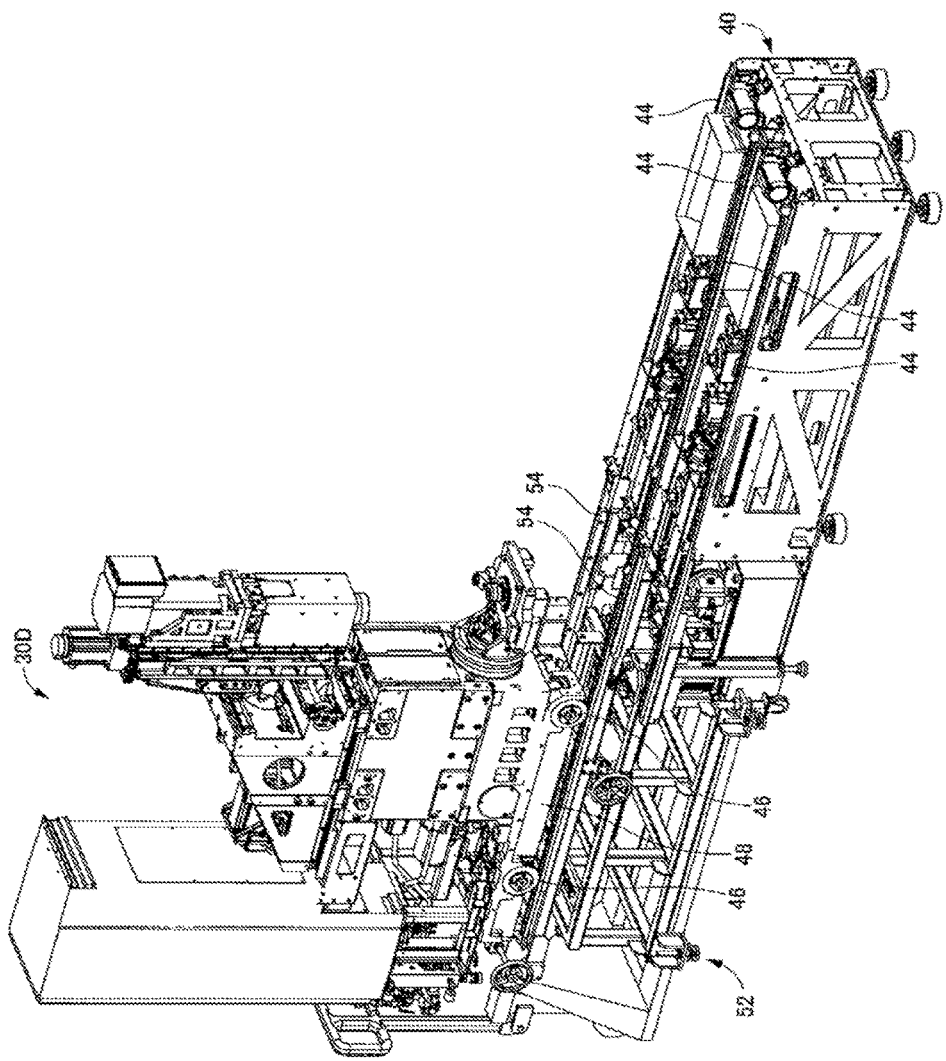
FIG. 6 is a perspective view illustrating a state in which the work machine module indicated in FIG. 1 is pulled out from the rear from the base.

Note that, FIG. 5 indicates a state in which the work machine module 30 on the right side is pulled out to the front in the intersecting direction. Put another way, work machine module 30 is able to be pulled out from the base unit 40 to be detached. A state in which the pulling out of module 30 is performed from the back using wheeled table 52 is indicated in FIG. 6. Wheeled table 52 has two rails 54 with the same sectional shape as the rails 44 that are provided in base unit 40, and is set with respect to base 20 such that the two rails 54 extend the two pairs of rails 44. In this state, some or all of the work machine modules 30 are able to be moved on wheeled table 52. Note that, in FIGS. 5 and 6, only one type of work machine module 30 is represented, but as described above, the four types of work machine modules 30 that are mounted on base 20 are able to be pulled out from base unit 40 either to the front side or the back side.

Figure 7:
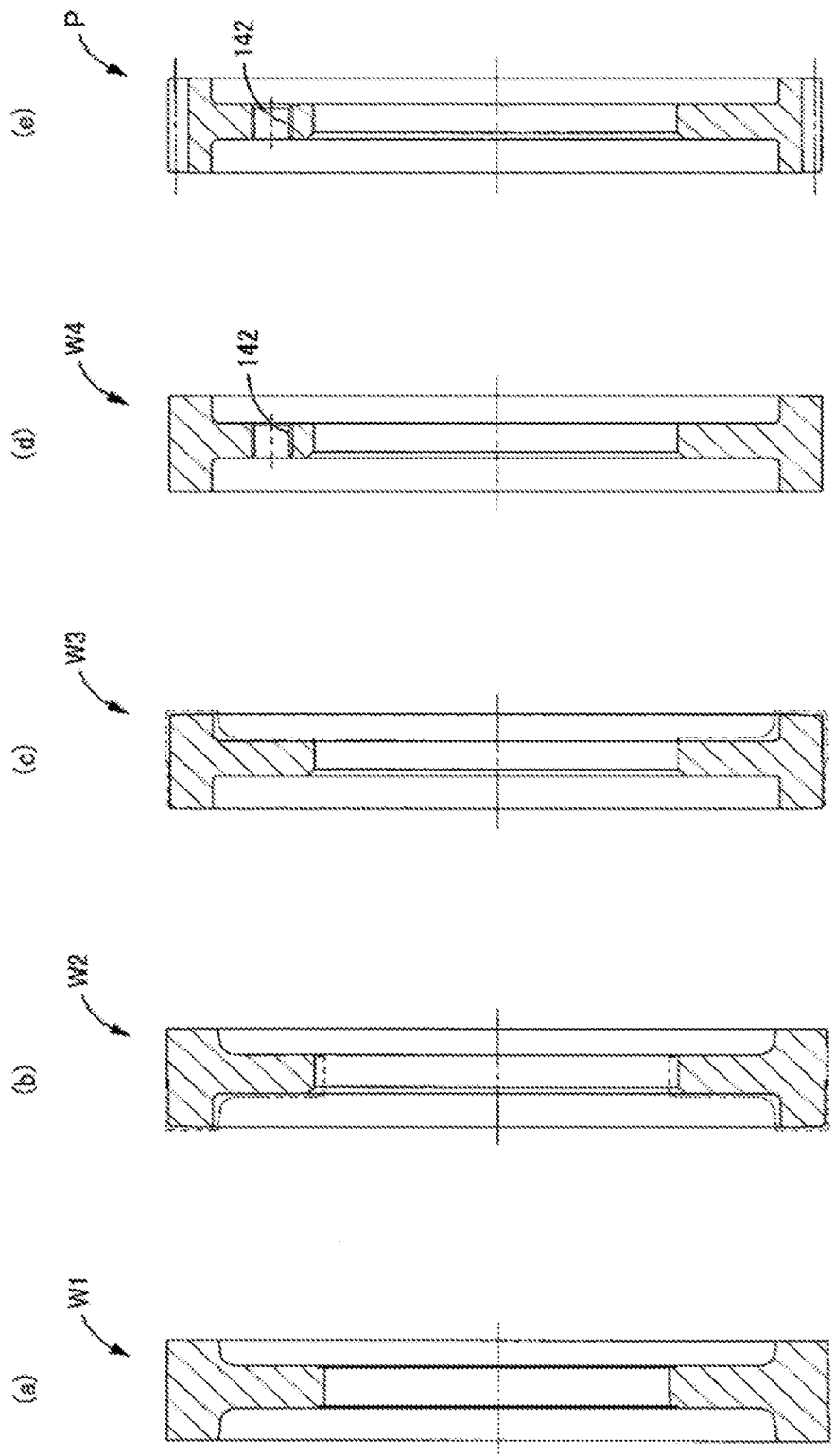
FIGS. 7(a) to 7(e) are sectional views illustrating a processing process of a product that is manufactured in the system indicated in FIG. 1.
Figure 8:
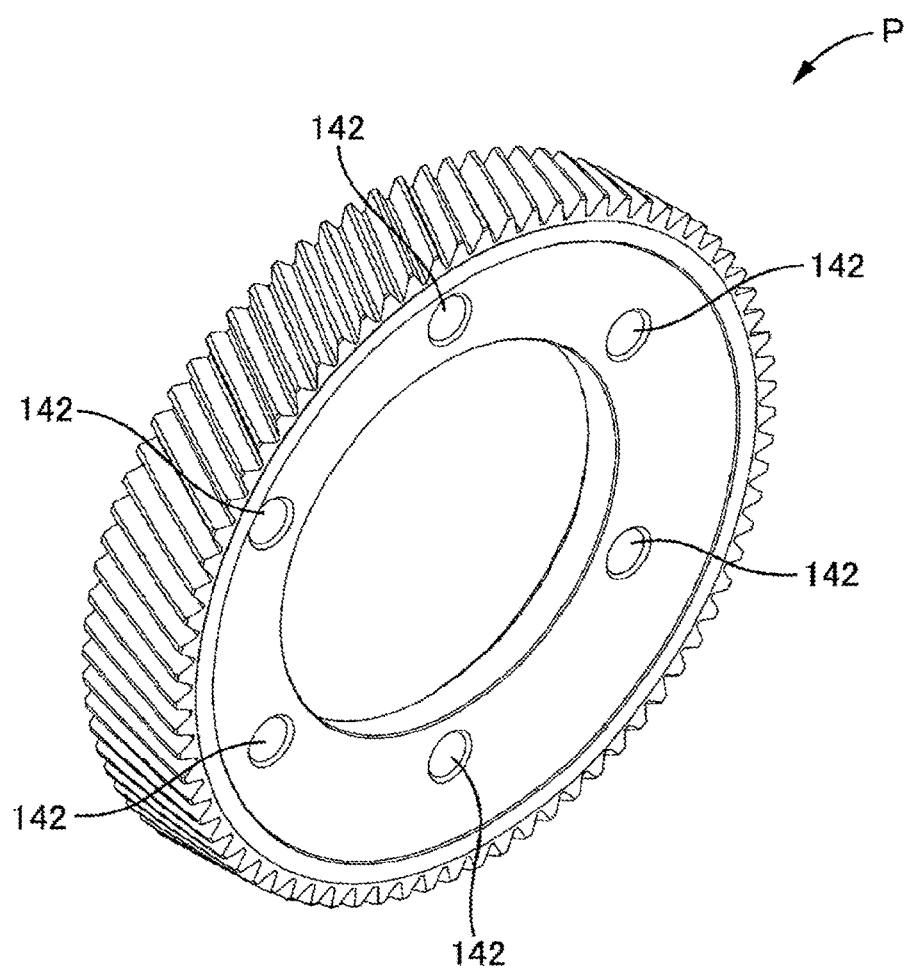
FIG. 8 is a perspective view of the product that is manufactured in the system indicated in FIG. 1.

Manufacturing system 10 manufactures product P indicated in FIG. 8 by performing machine processing work using various tools on workpiece W1 that is indicated in FIG. 7(a). In manufacturing system 10, workpiece loading module 30A is arranged so as to contact the right side of the base 20, two lathe modules 30B, inspection and measurement module 30C, drilling-milling module 30D, and hob module 30E are arranged on base 10 in order from the right side, and stock module 30F is disposed so as to contact the left side of base 20. Also, in manufacturing system 10, the workpiece that is loaded by workpiece loading module 30A is produced by work being performed by each work machine module 30 in order from the right side work machine module 30.

Figure 9:
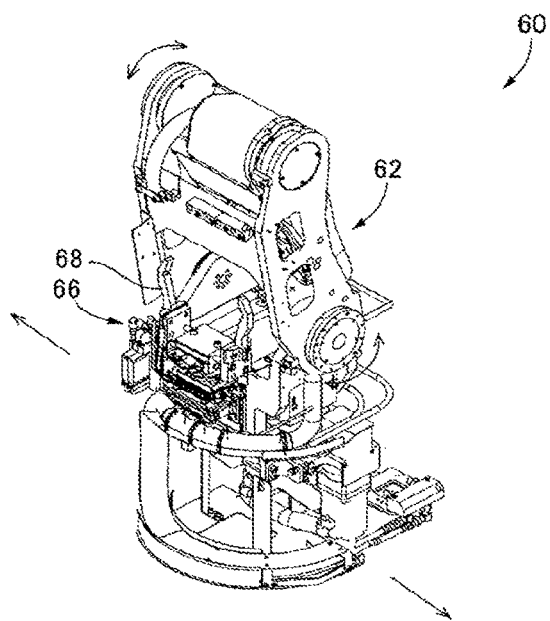
FIGS. 9(a) and 9(b) are perspective views of a workpiece transfer device provided in the system indicated in FIG. 1.
Figure 9:
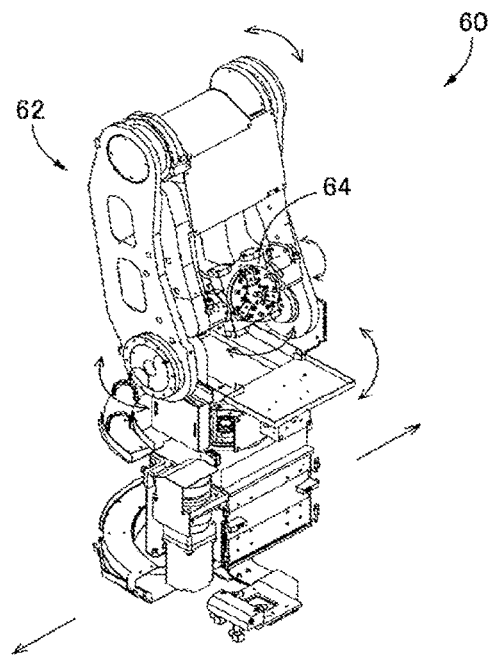

Note that, manufacturing system 10 is provided with workpiece loader 60 indicated in FIG. 9 as a workpiece transfer device that transfers the workpiece in the arrangement direction. Workpiece loader 60 is movable in the arrangement direction along a rail that is provided on the front side in the intersecting direction of base 20 and is able to transfer the workpiece across the multiple work machine modules 30. That is, illustration is omitted, but workpiece loader 60 is able to move in the arrangement direction in a space that is formed using base 20 and exterior panel 32.

In addition, workpiece loader 60 has articulated type arm 62 and chuck 64 that is provided on a leading end of arm 62 as a holding tool that holds the workpiece. That is, workpiece loaders 60 stretch arm 62 to a working position of work machine module 30, the workpiece is mounted at the working position by chuck 64, and the workpiece is able to be separated from the working position.

Furthermore, workpiece loader 60 has workpiece inversion device 66. Workpiece inversion device 66 grasps the workpiece using clamp 68, and the workpiece is inverted by rotating clamp 68 180° around an axis extending in an up-down direction. Note that, in a case where workpiece loader 60 is to change an orientation 180° in the up-down direction of the workpiece that is held with chuck 64, workpiece loader 60 is moved by arm 62 to a position at which it is possible to grasp the workpiece that is held with chuck 64 using clamp 68, the workpiece is grasped in clamp 68, and the workpiece that was inverted by workpiece inversion device 66 is held again using chuck 64.

Product Manufacturing Process and Work Machine Module Configuration (A) Workpiece Insertion (Workpiece Loading Module)

Figure 10:
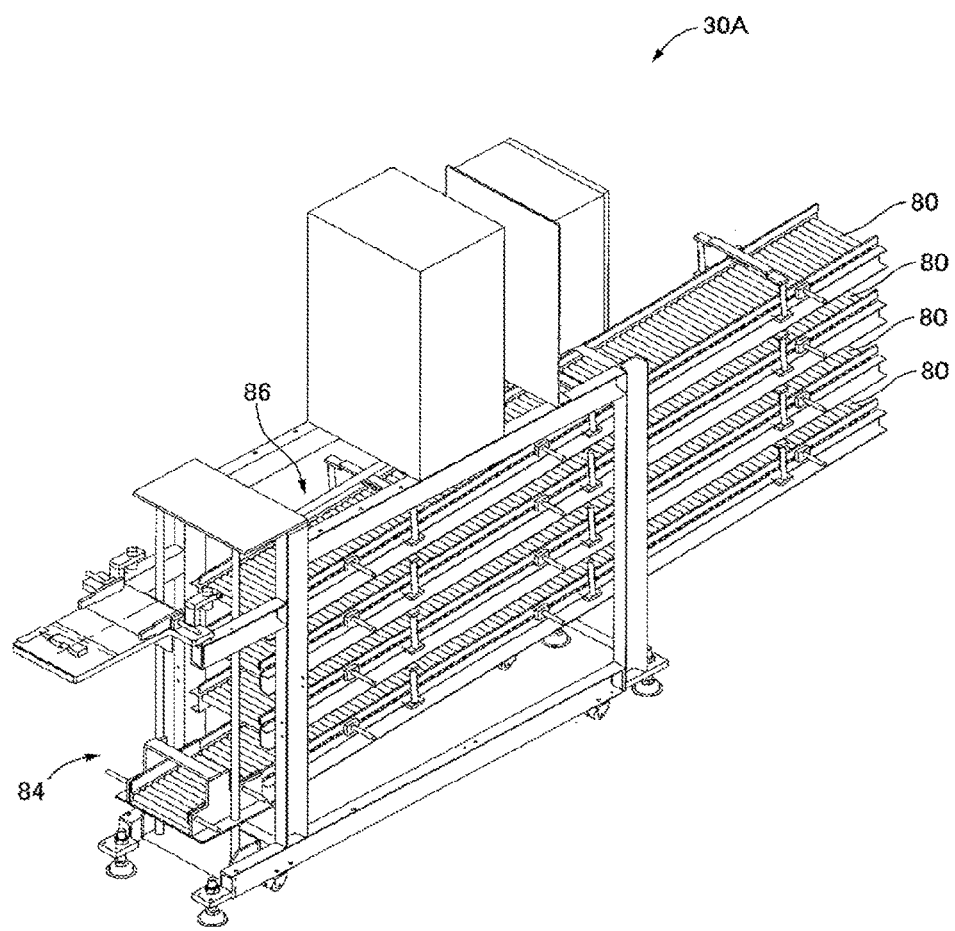
FIG. 10 is a perspective view of a workpiece loading module provided in the system indicated in FIG. 1.

Next, the manufacturing process of product P using manufacturing system 10 is described in order while describing the configuration of each work machine module 30. In manufacturing system 10, first, workpiece W1 is introduced by the workpiece loading module 30A. As shown in FIG. 10 (upper panels 34 and the like are omitted), workpiece loading module 30A has four stages such that workpiece pool 80 that extends in the intersecting direction is overlapped in the up-down direction and is able to accommodate multiple workpieces W1. Workpiece loading module 30A is provided with loading table 82 that is at a position at which the workpiece W1 is received in workpiece loader 60 at the upper side at the front end in the intersecting direction, that is, a loading position. In workpiece loading module 30A, lift 84 that is provided in front of workpiece pool 80 receives workpieces W1 one at a time from workpiece pool 80 and conveys the workpiece W1 to the height of loading table 82. Then, the workpiece W1 on lift 84 is pushed out to above loading table 82 by cylinder device 86 and is positioned at the loading position.

(B) Cutting Processing (Lathe Module)

Figure 11:
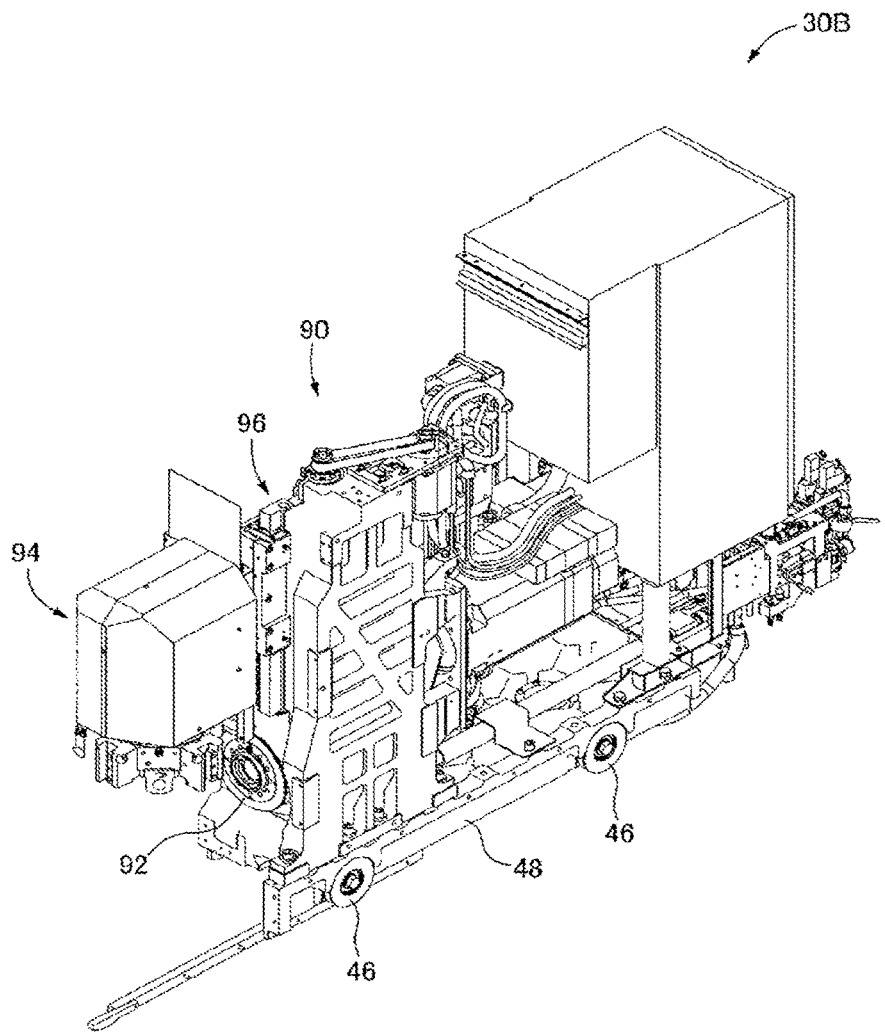
FIG. 11 is a perspective view of a lathe module provided in the system indicated in FIG. 1.

In manufacturing system 10, first, cutting processing is performed on the introduced workpiece W1 by the two lathe modules 30B. In each lathe module 30B, a lathe is modularized, and as shown in FIG. 11, lathe main body 90 is fixed on bed 48 that holds two pairs of wheels 46 described earlier to be rotatable. Lathe main body 90 is configured to include spindle 92 for rotating the workpiece by rotation of lathe main body 90, tool holding head 94 that holds multiple cutting tools that are respective tools, and head moving device 96 that moves tool holding head 94 up-down and front and back.

Each lathe module 30B holds the workpiece using the chuck that is provided on the leading end of spindle 92, and cutting processing is performed by the cutting tool that is held on head 94 while the workpiece is rotated. Note that, the first lathe module 30B cuts places on a two-dot chain line indicated in FIG. 7(b), and the second lathe module 30B cuts places on a two-dot chain line indicated in FIG. 7(c).

(C) Workpiece Inspection and Measurement (Inspection and Measurement Module)

Figure 12:
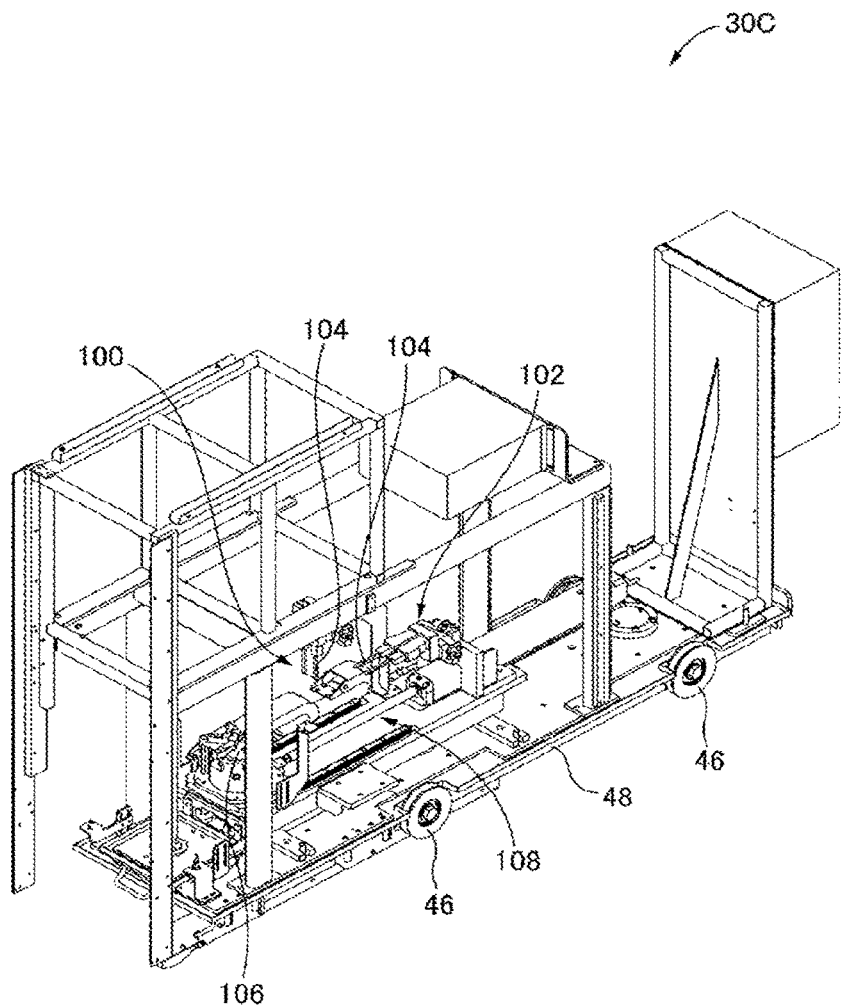
FIG. 12 is a perspective view of an inspection and measurement module provided in the system indicated in FIG. 1.

Workpiece W3 that is processed by two lathe modules 30B is transferred to inspection and measurement module 30C by workpiece loader 60. Inspection and measurement module 30C examines all of the workpieces W3 that are processed by the two lathe modules 30B. Inspection and measurement module 30C sets an inspection and measurement position to two places lined up in the intersecting direction using a deep depth (dimension in the intersecting direction is long). Also, as shown in FIG. 12, inspection and measurement module 30C is provided with a first inspection and measurement instrument 100 and a second inspection and measurement instrument 102 at the respective inspection and measurement positions at two places. Each of the two inspection and measurement instruments 100 and 102 has one pair of bars 104 that are movable in the arrangement direction and the intersecting direction and a part of the workpiece W3 is interposed by the one pair of jaws 104, and the dimensions of the part of the workpiece W3 are inspected from the gap between the one pair of bars 104 at that time.

In addition, inspection and measurement module 30C has workpiece moving device 108 that moves workpiece W3 which is held in chuck 106 in the intersecting direction. First, using workpiece moving device 108, inspection and measurement module 30C moves workpiece W3 to the inspection and measurement position at which first inspection and measurement instrument 100 is provided and examines the outer diameter of workpiece W3; next, workpiece W3 is moved to the inspection and measurement position at which second inspection and measurement instrument 102 is provided and inspects and measures the inner diameter of workpiece W3. Then, inspection and measurement module 30C issues a warning in a case where a difference from a designed value is large.

(D) Drilling Processing (Drilling-Milling Module)

Figure 13:
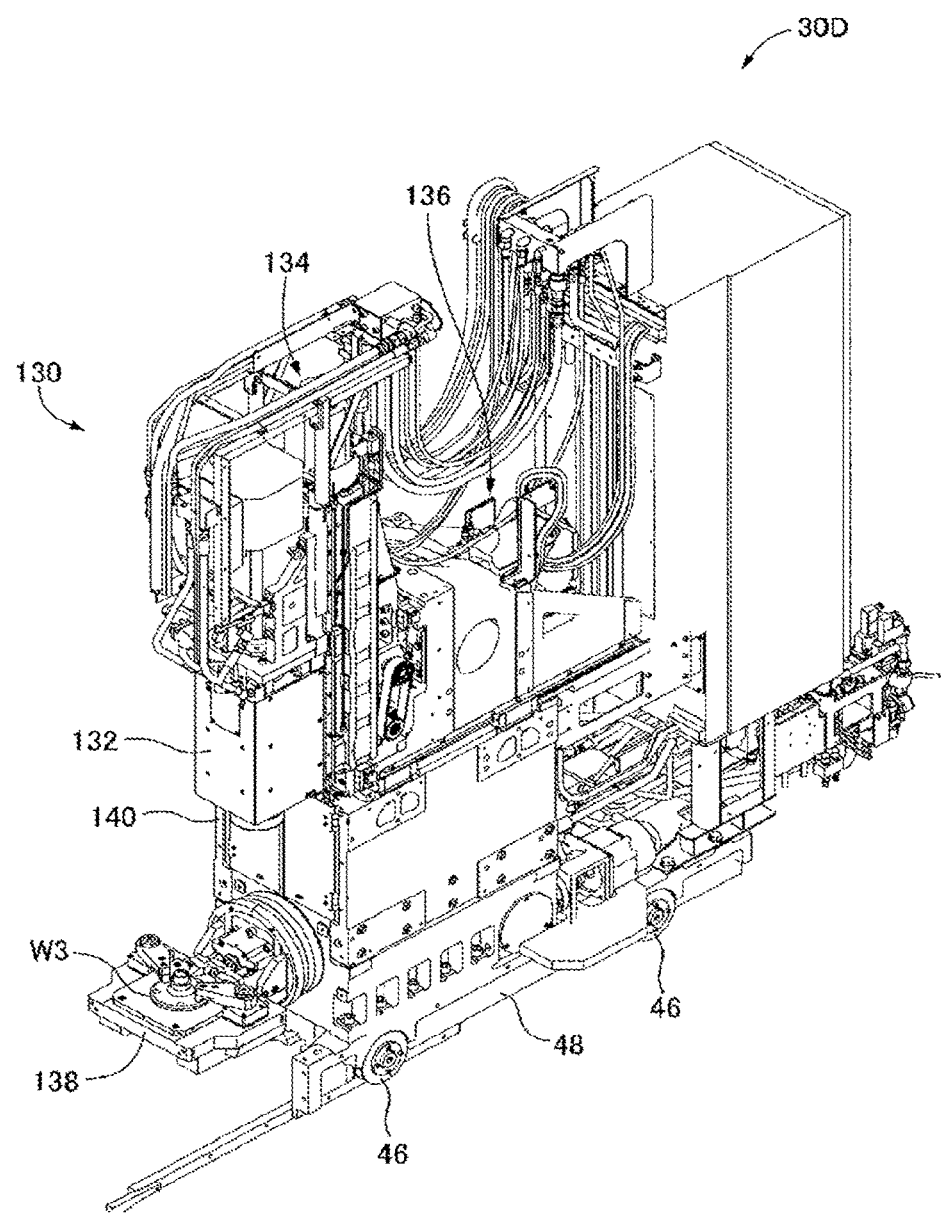
FIG. 13 is a perspective view of a drilling-milling module provided in the system indicated in FIG. 1.

Next, drilling processing is performed on workpiece W3 by drilling-milling module 30D. In each drilling-milling module 30D, a machining center is modularized, and as shown in FIG. 13, machining center main body 130 is fixed on bed 48 that holds two pairs of wheels 46 described above to be rotatable. Machining center main body 130 is configured to include main spindle head 132 that holds a tool such as a drill at a lower end portion, head lifting and lowering device 134 that moves main spindle head 132 in the up-down direction, head moving device 136 that moves main spindle head 132 along a horizontal plane by moving main spindle head 132 in two directions that are orthogonal to each other, workpiece table 138 that holds workpiece W3, and a tool magazine that is accommodated inside.

Each drilling-milling module 30D moves main spindle head 132 to a drilling position with respect to a workpiece that is fixed and held on workpiece table 138, main spindle head 132 is lowered while rotating spindle 140 to which a drill is attached, and six holes 142 indicated in FIG. 8 are created. Then, the tool that is held in main spindle head 132 is replaced with another tool that is accommodated in the tool magazine and processing such as chamfering the holes is performed.

(E) Tooth Cutting Processing (Hob Module)

Figure 14:
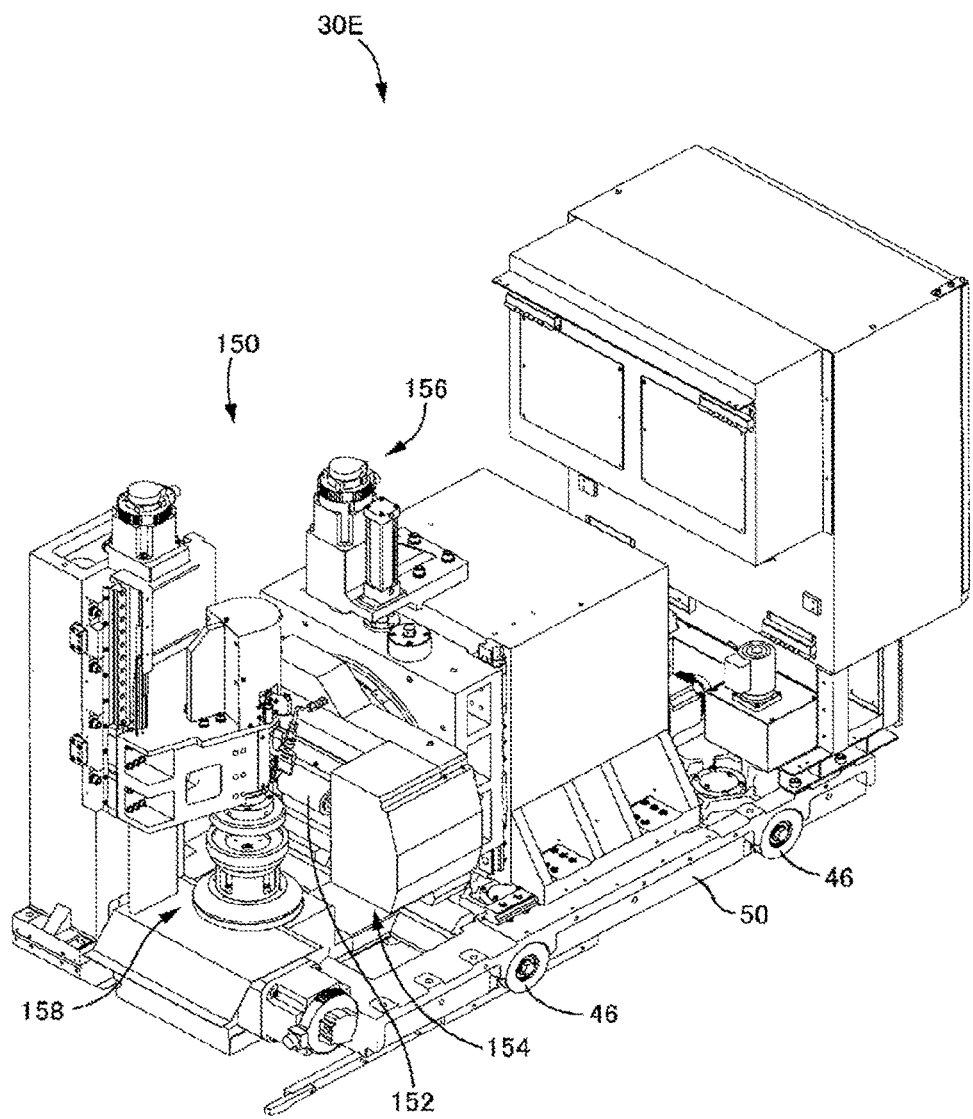
FIG. 14 is a perspective view of a hob module provided in the system indicated in FIG. 1.

Next, tooth cutting processing is performed by hob module 30E on workpiece W4 on which drilling processing was performed by drilling-milling module 30D. Hob module 30E is a modularized hobbing machine, and as shown in FIG. 14, hobbing machine main body 150 is fixed on bed 50 that holds two pairs of wheels 46 described above to be rotatable. Hobbing machine main body 150 is configured to include hob 152 that is a cutting tool that has a cutting blade along a screw on a cylindrical outer peripheral portion, hob rotation device 154 that holds and rotates hob 152 around an axis extending in the left-right direction, hob lifting and lowering device 156 that lifts and lowers hob 152 by lifting and lowering hob rotation device 154, and workpiece holding rotation device 158 that rotates workpiece W4 around a vertical axis by holding workpiece W4 from above and below. Hobbing machine main body 150 completes tooth cutting processing on workpiece W4 by applying hob 152 that is rotated by hob rotation device 154 to workpiece W4 that is rotated by workpiece holding rotation device 156, and lowering hob 152 from up to down. Thus, product P is completed by the work described above.

(F) Accommodation at Carry-Out Side (Stock Module)

Figure 15:
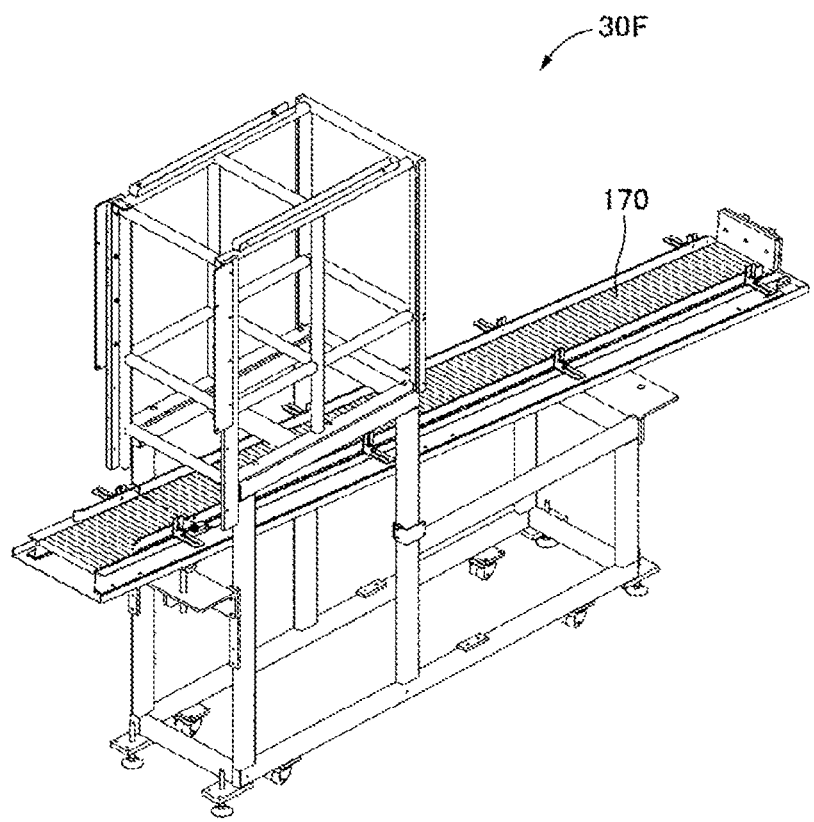
FIG. 15 is a perspective view of a stock module provided in the system indicated in FIG. 1.

Product P that is completed as one type of workpiece is accommodated in stock module 30F. As shown in FIG. 15, stock module 30F has a roller conveyor chute and has a roller conveyor 170 which is inclined such that a back side becomes lower extending in the intersecting direction, and the mounted product P is moved backward by roller conveyor 170 by mounting the product P using workpiece loader 60. That is, stock module 30F is able to accommodate multiple products P on roller conveyor 170 in a lined up state.

Fixing to Base of Work Machine Module

Figure 16:
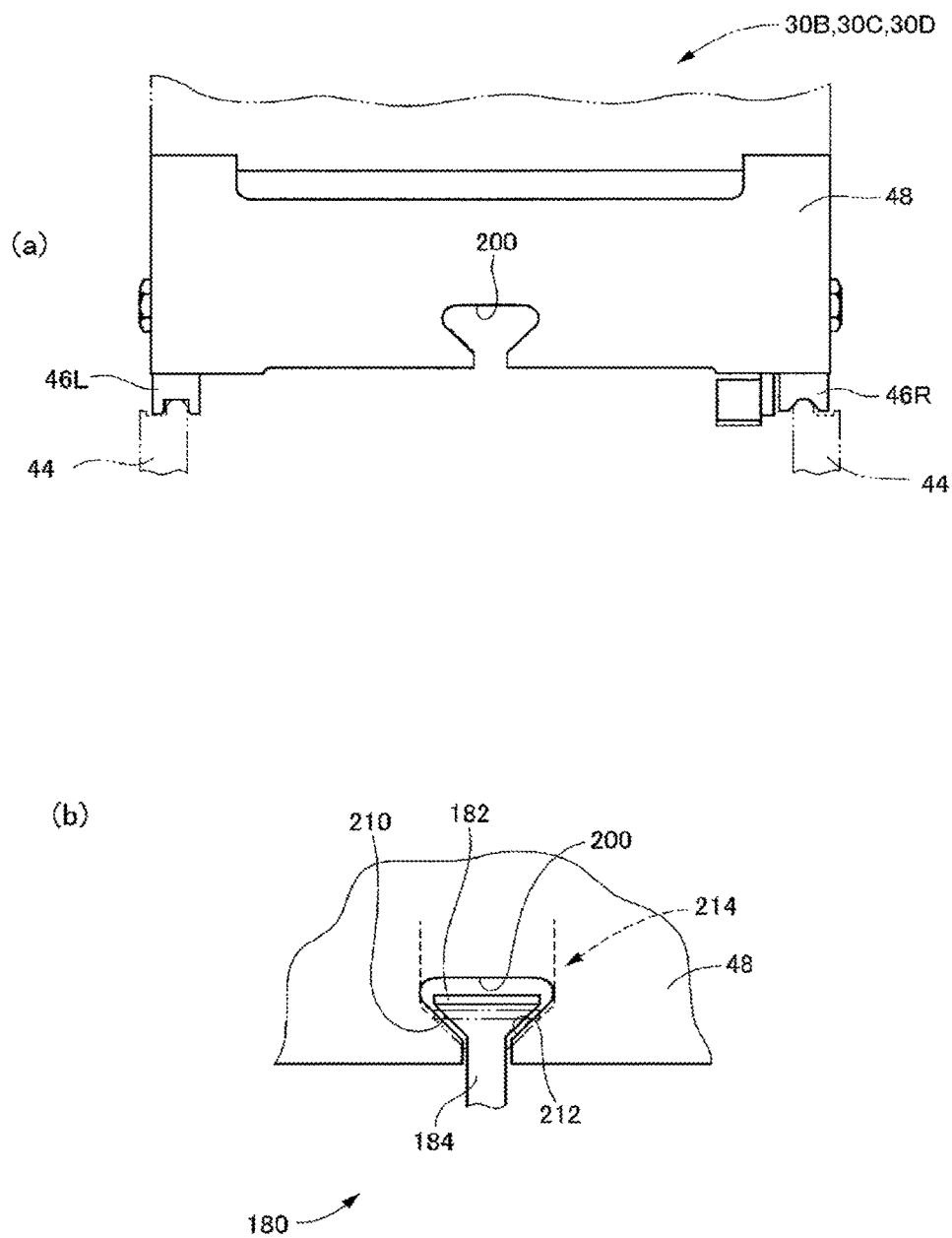
FIGS. 16(a) and 16(b) are front views illustrating apart in which a single region module and the base engage.

Manufacturing system 10 of the present embodiment has a structure in which each work machine module 10 is fixed on base 20. First, a case will be described in which lathe modules 30B, inspection and measurement module 30C, and drilling-milling module 30D that are single region modules which occupy one disposition region R are fixed to base 20. As described above, the single region modules have standardized bed 48 and two pairs of wheels 46, and the two pairs of wheels 46 are respectively placed on each of the two rails 44 that are laid in corresponding disposition regions R. As shown in FIG. 16(a), both of the two rails 44 have a mountain type cross sectional shape. Meanwhile, a V shape groove is formed on one side of the two pairs of wheels 46 (since the wheel is on the right side, this is sometimes referred to as "right wheel 46R" in the description below), and a cross-sectional shape groove, which has side faces that are parallel to each other and a flat bottom face, is formed on the other side of the two pairs of wheels 46 (since the wheel is on the left side, this is sometimes referred to as "left wheel 46L" in the description below).

There is a state in which the right wheel 46R and the rail 44 are engaged with almost no gap and positional deviation in the arrangement direction is prohibited, whereas the left wheel 46L and the rail 44 are engaged in a state having a gap therebetween with positional deviation permitted in the arrangement direction. Accordingly, when each of the single region modules is laid on base 20, the position in the arrangement direction is accurately specified by the right wheel 46R and the rail 44 engaging.

In addition, a module fixing mechanism for fixing work machine module 30 at the setting position is provided on base 20. The module fixing mechanism is provided in each disposition region R. As shown in FIG. 3, each module fixing mechanism that is provided in each disposition region R includes two module locking devices 180 as main constituents. The two module locking devices 180 are disposed lined up in the front-back direction between the two rails 44 that are laid in the disposition region R.

Figure 17:
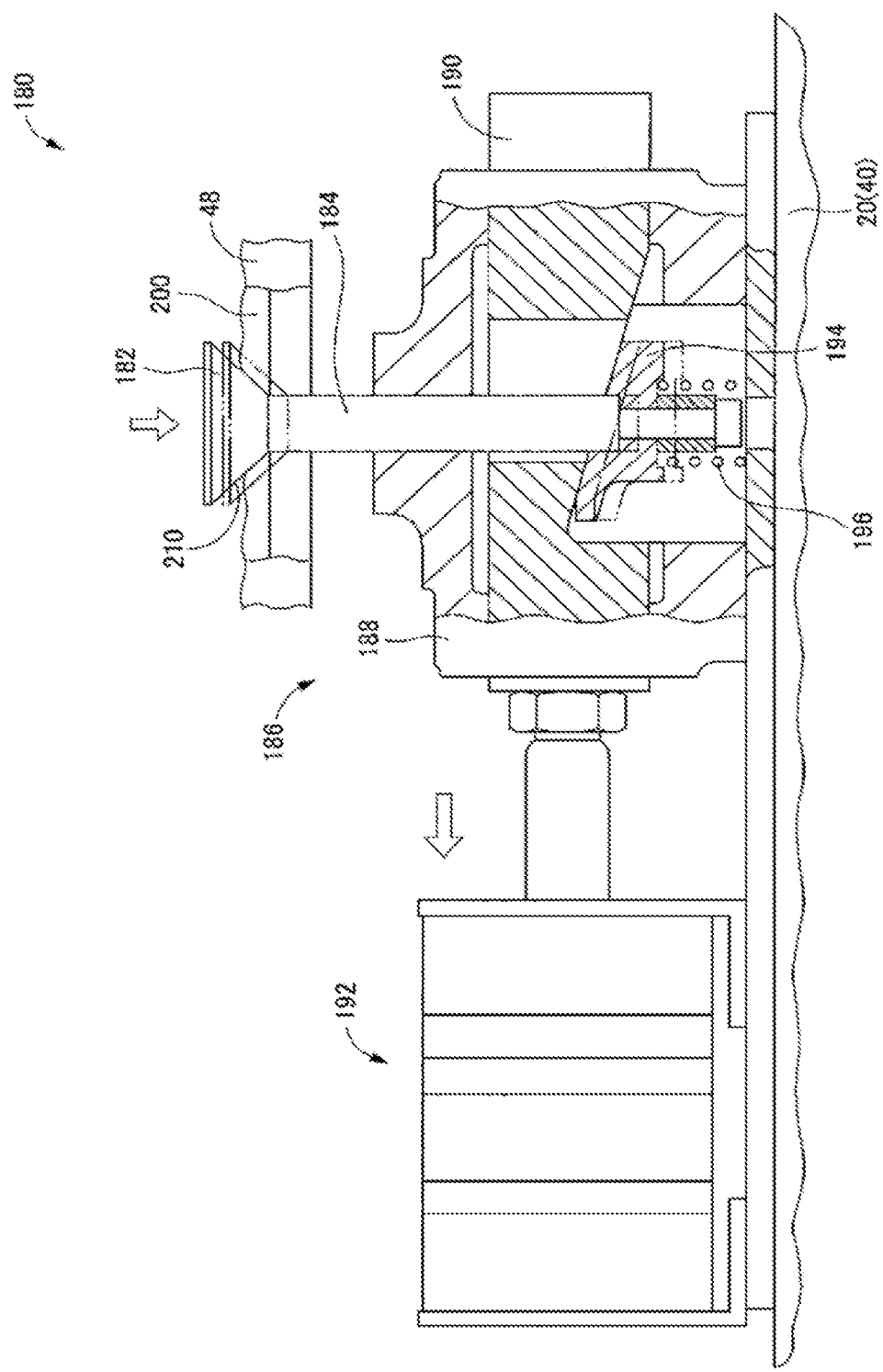
FIG. 17 is a side view (one part is a sectional view) illustrating the module fixing mechanism that is disposed on the base.

As shown in FIG. 17, each module locking device 180 is configured to include locking rod 184 that has rod head section 182 with a shape that is a truncated cone inverted at the upper end portion and rod lifting and lowering device 186 for lifting and lowering locking rod 184. Rod lifting and lowering device 186 is configured to include housing 188, wedge rod 190 that is held to be movable in housing 188 in the front-back direction, actuator 192 that operates wedge rod 190 in the front-back direction, lifting and lowering piece 194 that operates in an up-down direction accompanying movement of wedge rod 190 in the front-back direction, and spring 196 that elastically supports lifting and lowering piece 194 from below. Locking rod 184 is fixed to extend upward from lifting and lowering piece 194. That is, when wedge rod 190 operates in the front-back direction according to the operation of actuator 192, lifting and lowering piece 194 lifts and lowers and locking rod 184 also lifts and lowers. FIG. 17 shows a state in which wedge rod 190 is advanced, and a state in which locking rod 184 is lifted. Then, as indicated by the two-dot chain line in the diagram, locking rod 184 is lowered by wedge rod 190 being caused to retreat by actuator 192.

Figure 4:
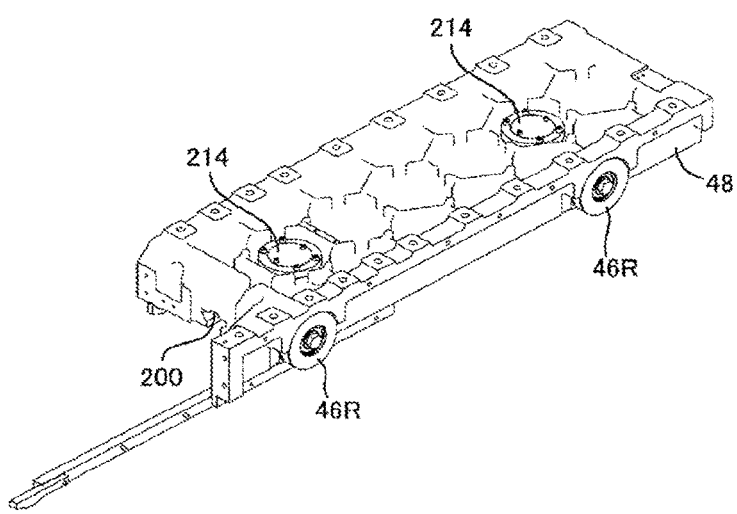
FIGS. 4(a) and 4(b) are perspective views illustrating a bed of a work machine module.
Figure 4:
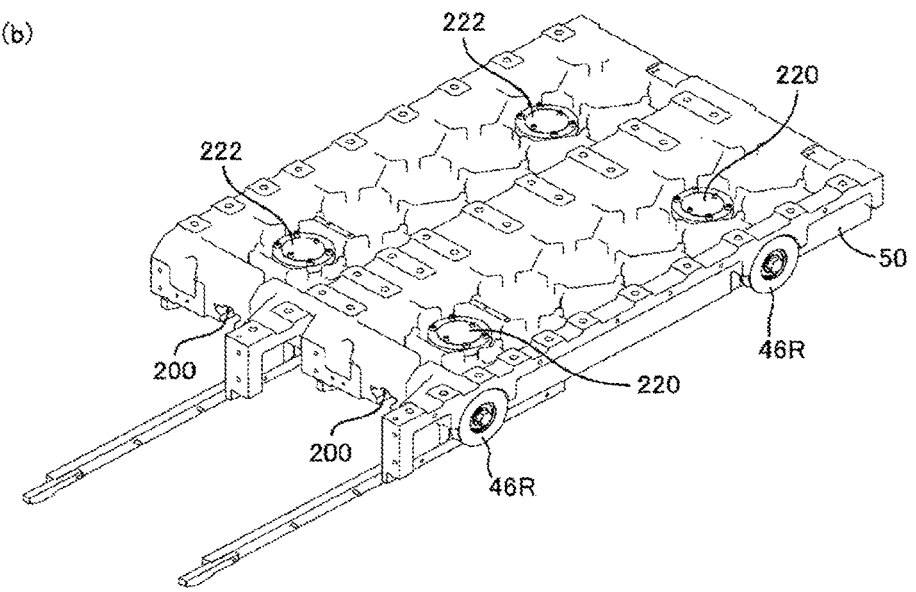

Meanwhile, as shown in FIG. 4 (a), slot 200 with a cross section that is generally an inverted triangle is formed on a lower portion of bed 48 of the single region module so as to pass in the front-back direction. Rod head section 182 of locking rod 184 described above is positioned inside slot 200 in a state in which the single region module is mounted on base 20. In a case where locking rod 184 is lifted, there is a state in which the single region module is movable along rail 44 on base 20 without locking rod 184 engaging with slot 200. There is counterbore section 214 into which a counterbore, which has tapered surface 212 with a shape that matches tapered surface 210 of rod head section 182, is applied at a predetermined location in slot 200 (refer to FIGS. 4(a) and 16(b)). When locking rod 184 is positioned at the location, the state is such that tapered surface 210 of rod head section 182 tightly contacts tapered surface 212 of counterbore section 214 according to lowering of locking rod 184. That is, in that state, the state is such that locking rod 184 locks with counterbore section 214, that is, a state of locking the single region module. In more detail, in a state of being lowered, the state is such that locking rod 184 draws counterbore section 214 downward, and the single region module is fixed at the setting position on base 20. Note that, two module locking devices 180 are simultaneously operated, and the single region module is fixed on base 20 by the two module locking devices 180.

That is, the module fixing mechanism is configured such that locking rod 184 that is a locking section locks the counterbore section 214 as a locking target section that is formed in a single region module. Then, rod lifting and lowering device 186 that lifts and lowers locking rod 184 functions as a locking section actuating device, and the module fixing mechanism is configured to fix in a state in which the single region module is drawn toward base 20 by biasing the locking section toward the locking target section.

Figure 18:
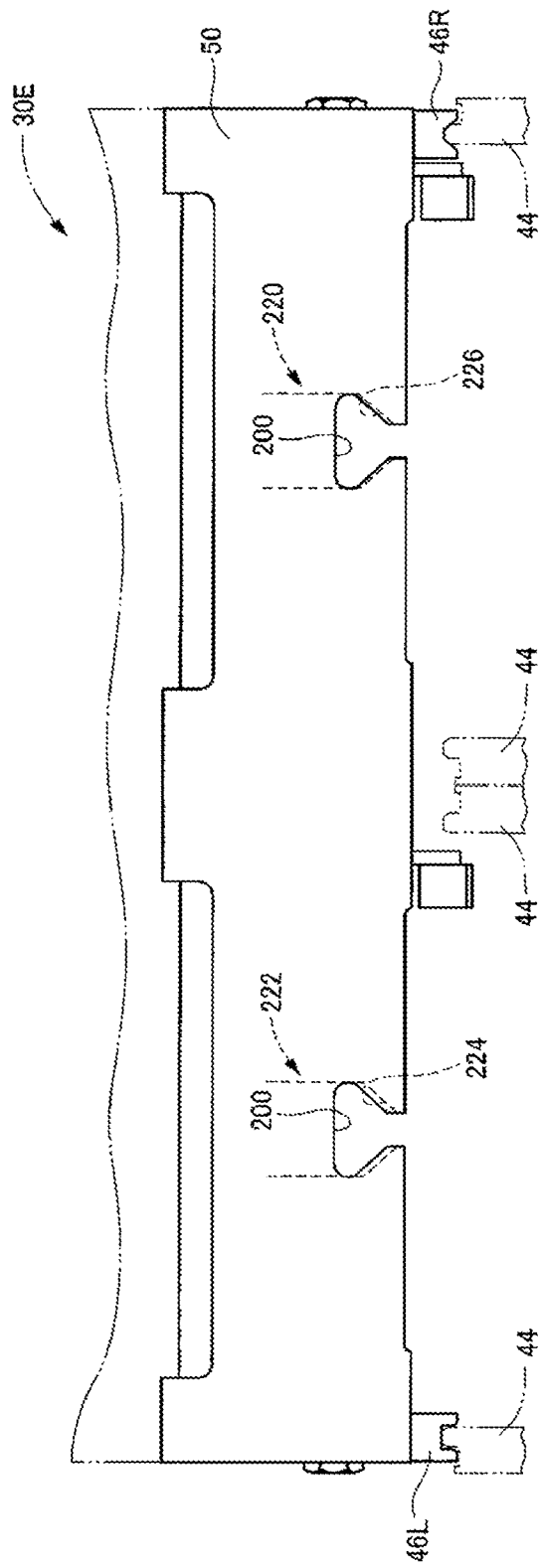
FIG. 18 is a front view illustrating a part in which a multi-region module and the base engage.

Next, a case will be described in which hob module 30E which is a multi-region module that occupies two disposition regions R is fixed to base 20. As shown in FIG. 18, two slots 200 that are formed in bed 48 of the single region module are formed in bed 50 of hob module 30E. Thus, in a state in which hob module 30E is laid on base 20, rod head section 182 of locking rod 184 of the module fixing mechanism that is disposed on the right side out of the two disposition regions R is positioned inside two slots 200 on the right side, and rod head section 182 of locking rod 184 of the module fixing mechanism that is disposed on the left side out of the two disposition regions R is positioned inside two slots 200 on the left side.

As described above, work machine module 30 specifies the position of the right wheel 46R in which a V-shaped cross-sectional shape groove is formed in the arrangement direction. In addition, as described above, the module fixing mechanism is configured so as to fix work machine module 30 in a state in which work machine module 30 is drawn toward base 20. Therefore, in manufacturing system 10, hob module 30E is fixed to base 20 at the setting value using the module fixing mechanism close to the right wheel 46R with reference to the arrangement direction and the rail 44 such that force tends to act on an engaging section of the right wheel 46R with reference to the arrangement direction and the rail 44. That is, as shown in FIG. 4(*b*), bed 50 of hob module 30E is on the right side out of the two slots 200, but has two counterbore sections 220 with the same shape as counterbore section 214 that is formed on bed 48 of the single region module described above. That is, in a state in which locking rod 184 of the module fixing mechanism that is disposed in the right side disposition region R is lowered, the state is such that locking rod 184 draws counterbore sections 220 downward, and hob module 30E is fixed at the setting position on base 20.

In addition, the left side slot 200 has counterbore section 220 in which there is the right side slot 200 (hereinafter, referred to as "right side counterbore section 220") and the two counterbore sections 222 with substantially the same shape (hereinafter, referred to as "left side counterbore sections 222"). However, the left side counterbore section 222 is formed with a deep counterbore section compared with the right side counterbore section 220. Specifically, tapered surface 224 of the left side counterbore section 222 is formed slightly below tapered surface 226 of the right side counterbore section 220. Accordingly, when hob module 30E is fixed on base 20, the module fixing mechanism that is disposed on the left side disposition region R is also operated, but the force that restricts the hob module 30E using the module fixing mechanism is smaller than a restricting force by the module fixing mechanism that is disposed in the left side disposition region R such that fixing to the setting position of the module is not interfered with by the module fixing mechanism that is disposed in the left side disposition region R. Specifically, in the lowering state, locking rod 184 of the module fixing mechanism that is disposed in the left side disposition region R just touches the left side counterbore section 220, and force that draws hob module 30E downward is barely generated.

That is, in manufacturing system 10, when hob module 30E that is a multi-region module is fixed, the module fixing mechanism that is disposed in the right side disposition region R functions as a main module fixing mechanism, and the module fixing mechanism that is disposed in the left side disposition region R functions as a sub-module fixing mechanism. Also, hob module 30E has the right side counterbore section 220 as a first locking target section that corresponds to the main module fixing mechanism and the left side counterbore section 222 as a second locking target section that corresponds to the sub-module fixing mechanism.

As described above, in manufacturing system 10, when work machine modules 30 are mounted on base 20, it is possible to accurately fix to the installation position without performing alignment, and it is possible to easily perform replacement and setup change of work machine modules 30 in a short time.

REFERENCE SIGNS LIST

10: MANUFACTURING SYSTEM, 20: BASE, 30: WORK MACHINE MODULE, 30A: WORKPIECE LOADING MODULE, 30B: LATHE MODULE (SINGLE REGION MODULE), 30C: INSPECTION AND MEASUREMENT MODULE (SINGLE REGION MODULE), 30D: DRILLING-MILLING MODULE (SINGLE REGION MODULE), 30E: HOB MODULE (MULTI-REGION MODULE), 30F: STOCK MODULE, 40: BASE UNIT, 44: RAIL, 46: WHEEL, 46R: RIGHT WHEEL, 46L: LEFT WHEEL, 48: BED (SINGLE REGION MODULE), 50: BED (MULTI-REGION MODULE), 180: MODULE LOCKING DEVICE (MODULE FIXING MECHANISM), 184: LOCKING ROD (LOCKING SECTION), 186: ROD LIFTING AND LOWERING DEVICE (LOCKING SECTION ACTUATING DEVICE), 200: SLOT, 210: TAPERED SURFACE (ROD HEAD SECTION), 212: TAPERED SURFACE (COUNTERBORE SECTION), 214: COUNTERBORE SECTION (LOCKING TARGET SECTION), 220: RIGHT SIDE COUNTERBORE SECTION (FIRST LOCKING TARGET SECTION), 222: LEFT SIDE COUNTERBORE SECTION (SECOND LOCKING TARGET SECTION)

The invention claimed is:

1. A manufacturing system comprising:
   a base; and
   multiple work machine modules that are each arranged on the base on a common arrangement axis extending in an arrangement direction, and are each attachable to and detachable from the base, wherein
   the base includes multiple rail pairs that are provided so that each pair corresponds to one of the multiple work machine modules, and each pair of the rails is laid so that a respective longitudinal direction thereof extends in an intersecting direction that is a direction that intersects with the arrangement direction,
   each of the multiple work machine modules includes a respective one pair of wheels,
   the base is configured such that the position, in the arrangement direction and on the base, of each of the multiple work machine modules is specified by one wheel of the corresponding one wheel pair engaging with one rail of the corresponding one rail pair with almost no gap in the arrangement direction between said respective one wheel and said respective one rail such that positional deviation of the respective one wheel in the arrangement direction is prohibited, and the other wheel of the corresponding one wheel pair engaging with the other rail of the corresponding one rail pair with a gap in the arrangement direction between said respective other wheel and said respective other rail such that positional deviation of said respective other wheel is permitted in the arrangement direction, and the base further includes multiple module fixing mechanisms, each of which restricts a given one of the multiple work machine modules such that the given work machine module is drawn toward the base, and fixes the given work machine module at a respective setting position that is a designated position on the base.

2. The manufacturing system according to claim 1, wherein each of the rails is of a mountain type cross sectional shape, a respective V-shape cross-sectional shape groove is formed in each of the one wheels of each of the one wheel pairs, and a respective cross-sectional shape groove having a flat bottom face is formed on each of the other wheels of each of the one wheel pairs, and thereby, each of the one wheels of each of the one wheel pairs engages with the corresponding one rail of the respective one rail pair in a state in which positional deviation of the respective one wheel in the arrangement direction is prohibited and the respective other wheel of the respective one wheel pair engages with the respective other rail of the corresponding one rail pair in a state in which positional deviation of the respective other wheel is permitted in the arrangement direction.

3. The manufacturing system according to claim 1, wherein each respective one of the wheel pairs is located, with respect to the intersecting direction, on a common side of the corresponding work machine module.

4. The manufacturing system according to claim 1, wherein each of the multiple module fixing mechanisms is configured to include a respective locking section that is able to lock a respective locking target section that is formed in the work machine module being fixed, and a respective locking section actuating device that operates the respective locking section to switch to and from a state in which the respective locking section locks the respective locking target section and a state in which the respective locking section does not lock the respective locking target section, and, in a state in which the respective locking section locks the respective locking target section, it is possible for the respective locking section operating device to fix the work machine module being fixed in a state of the work machine module being fixed being drawn toward the base by biasing the respective locking section toward the respective locking target section.

5. The manufacturing system according to claim 1, wherein multiple disposition regions on the base are set with an equal width to each other in the arrangement direction, wherein the following are provided in each of the multiple disposition regions:

(i) one of the rail pairs, with the two rails of the one rail pair being separated by a gap in the arrangement direction, and (ii) one of the multiple module fixing mechanisms, and wherein the work machine modules include: (a) a single region module that occupies one of the multiple disposition regions, or (b) a multi-region module that occupies two or more out of the multiple disposition regions.

6. The manufacturing system according to claim 5, wherein the work machine modules include a multi-region module that occupies two or more out of the multiple disposition regions, and wherein the multi-region module is fixed to the base by two or more of the module fixing mechanisms that are provided in the two or more disposition regions that the multi-region module occupies.

7. The manufacturing system according to claim 6, wherein of the two or more of the module fixing mechanisms that are provided in the two or more disposition regions that the multi-region module occupies, one of the two or more of the module fixing mechanisms is defined as a main module fixing mechanism and another of the two or more of the module fixing mechanisms is defined as a sub-module fixing mechanism, the multi-region module is configured such that the multi-region module is fixed to the base by the sub-module fixing mechanism with a force that is smaller than a force of fixing the multi-region module to the base by the main module fixing mechanism.

8. The manufacturing system according to claim 7, wherein each of the multiple module fixing mechanisms is configured to include a respective locking section that is able to lock a respective part of the work machine module being fixed by that module fixing mechanism, and a respective locking section actuating device that operates the respective locking section to switch to and from: a state in which the respective locking section locks the respective part of the work machine module being fixed, and a state in which the respective locking section does not lock the respective part of the work machine module being fixed by that module fixing mechanism, and the multi-region module has, as the part, (i) a first locking target section that is locked by the locking section of the main module fixing mechanism that corresponds to the main module fixing mechanism and (ii) a second locking target section that is locked by the locking section of the sub-module fixing mechanism that corresponds to the sub-module fixing mechanism, and is configured such that a force at which the sub-module fixing mechanism fixes the multi-region module to the base in a state in which the locking section of the sub-module fixing mechanism locks the second locking target section is smaller than the force at which the main module fixing mechanism restricts the multi-region module to the base in a state in which the locking section of the main module fixing mechanism locks the first locking target section.

9. The manufacturing system according to claim 1, wherein the multiple work machine modules are arranged adjacent to each other in the arrangement direction.

10. The manufacturing system according to claim 1, wherein each of the multiple work machine modules is able to be pulled so as to move in the intersecting direction by the wheels of the corresponding one pair of wheels rolling on the rails of the corresponding one pair of rails.

11. The manufacturing system according to claim 10, wherein each of the multiple work machine modules is able to be selectively pulled so as to move in both of two directions that are opposite from each other along an axis along which the intersecting direction extends.

\* \* \* \* \*